(12) United States Patent
Lu et al.

(10) Patent No.: US 11,874,703 B2
(45) Date of Patent: Jan. 16, 2024

(54) MOBILE DOCK

(71) Applicant: DEXIN CORPORATION, New Taipei (TW)

(72) Inventors: Ho Lung Lu, New Taipei (TW); Hsiu Hsuan Lin, New Taipei (TW); Yuan Jung Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 779 days.

(21) Appl. No.: 17/036,607

(22) Filed: Sep. 29, 2020

(65) Prior Publication Data

US 2022/0066505 A1 Mar. 3, 2022

(30) Foreign Application Priority Data

Aug. 28, 2020 (TW) .................................. 109129503

(51) Int. Cl.
*G06F 1/16* (2006.01)
*A63F 13/23* (2014.01)
*G06F 13/12* (2006.01)

(52) U.S. Cl.
CPC ............ *G06F 1/1632* (2013.01); *A63F 13/23* (2014.09); *G06F 13/122* (2013.01)

(58) Field of Classification Search
CPC ....... G06F 1/1632; G06F 13/122; A63F 13/23
See application file for complete search history.

(56) References Cited

U.S. PATENT DOCUMENTS

| 8,359,372 | B2 | 1/2013 | Yalovsky |
| 9,126,119 | B2 | 9/2015 | Joynes et al. |
| 9,164,544 | B2 * | 10/2015 | Sirpal ................. G06F 3/04883 |
| 10,010,789 | B2 | 7/2018 | Koizumi et al. |

(Continued)

FOREIGN PATENT DOCUMENTS

| CN | 102143336 A | 8/2011 |
| CN | 103135454 A | 6/2013 |

(Continued)

OTHER PUBLICATIONS

Notice of Allowance dated Jan. 19, 2022 by JPO in corresponding JP application 2020-187194 (3 pages).

(Continued)

*Primary Examiner* — Reginald A Renwick
(74) *Attorney, Agent, or Firm* — Millen, White, Zelano & Branigan, P.C.; William F. Nixon

(57) ABSTRACT

A mobile dock is provided. The mobile dock is configured to electrically coupled to a mobile device having a first identifier and an application, and includes a control unit, a memory unit and an I/O module. The memory unit is electrically coupled to the control unit and stores at least a second identifier and at least a configuration file. The I/O module includes an I/O unit, a mobile port and an I/O port, and the mobile port is configured to electrically coupled to the mobile device. When the mobile device is electrically coupled to the mobile dock, the control unit receives the first identifier and triggers the configuration file corresponding to the first identifier, and transmits the second identifier corresponding to the first identifier to the mobile device. The mobile device receives the second identifier and triggers the application.

18 Claims, 5 Drawing Sheets

(56) References Cited

U.S. PATENT DOCUMENTS

| | | | |
|---|---|---|---|
| 10,198,272 B2 | 2/2019 | Lewis | |
| 2010/0017554 A1 | 1/2010 | Sun | |
| 2013/0058022 A1* | 3/2013 | Knutson | G06F 1/1632 |
| | | | 361/679.01 |
| 2013/0132347 A1 | 5/2013 | Chen | |
| 2013/0342638 A1 | 12/2013 | Sobti et al. | |
| 2014/0075075 A1* | 3/2014 | Morrill | H04M 1/72412 |
| | | | 710/303 |
| 2019/0110253 A1 | 4/2019 | Guzik et al. | |
| 2022/0051216 A1* | 2/2022 | Sanchez De la Rosa | |
| | | | G06Q 20/3278 |

FOREIGN PATENT DOCUMENTS

| | | |
|---|---|---|
| CN | 103442147 A | 12/2013 |
| CN | 106250096 A | 12/2016 |
| JP | 2004220208 A | 8/2004 |
| JP | 2005321976 A | 11/2005 |
| JP | 2007087420 A | 4/2007 |
| JP | 2010113519 A | 5/2010 |
| TW | I404279 B | 9/1997 |
| TW | 201003401 A | 1/2010 |
| TW | 201005535 A | 2/2010 |
| TW | 201643710 A | 12/2016 |
| TW | I570529 B | 2/2017 |
| WO | 19206426 A1 | 10/2019 |

OTHER PUBLICATIONS

Office Action in corresponding TW appln. 109129503 dated Nov. 30, 2021 (pp. 1-5) and english translation thereof.
"Charging & Other Accessories—Officially Licensed Products"—Sep. 28, 2020 https://www.playstation.com/en-us/explore/accessories/charging-and other-accessories (pp. 1-11).

* cited by examiner

MOBILE DOCK

CROSS-REFERENCE TO RELATED PATENT APPLICATION

This application claims the benefit under 35 U.S.C. § 119 of Taiwan Patent Application Ser. No. 109129503 filed on Aug. 28, 2020, which is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mobile dock, and more particularly to a mobile dock configured to electrically coupled to a mobile device.

BACKGROUND

Expansion and conversion equipments for mobile devices in the existing art provide expanded functions such as power charging, data transmission, data storage and/or connection with other devices (such as magnetic disks). However, the existing expansion and conversion equipments are still deficient in providing functions of integrating a plurality of different equipments as well as automatically and intelligently operating these equipments according to personalized demands of a user. In fact, when a user intends to attain the integration of a plurality of different types of devices by an expansion equipment, the user has to possess thorough knowledge regarding the information of the software, the peripheral and the system associated with these devices, in order to obtain an effective integration. Besides, steps of installing and setting need to be repeated from scratch whenever the expansion equipment is used to connect with these devices.

In addition, as mentioned above, in the existing art, when different mobile devices (such as mobile devices of different users) are connected to the expansion equipment, the expansion equipment cannot perform intelligent judgment for providing personalized services to different users based on the identities of the users. In other words, there is a need to provide an expansion equipment or a conversion equipment which is able to execute unique processes and operations according to the identity of the user of the mobile device that is connected thereto.

In the existing art, a KVM (Keyboard, Video, Mouse) switch may connect a plurality of devices such as keyboard, display, mouse, audio devices, USB (Universal Serial Bus) in series for switching and controlling their functions. Further, a hub may be utilized in combination with the KVM switch. However, the KVM switch only provides the function of forwarding signal.

Further, although some of the existing expansion equipment may transfer a display screen of a mobile device to an external display, e.g., transfer a display screen of a mobile phone or a game console to a home display, such as a television, for better user experience. However, such expansion equipment only serves to transfer the content of the screen from a mobile device to another display. Therefore, such expansion equipment is unable to allow the user to execute or change the functions of the software or hardware of the mobile device through the expansion equipment. In other words, the existing expansion equipment merely functions as a forwarding station for forwarding signal, and holds no control on the mobile device and/or the display connected thereto.

For example, NINTENDO CO. have provided a cradle (U.S. Pat. No. 10,010,789 B2). When the game console (the computer device) is connected to the cradle, the display of the game console can be turned off automatically, and the generated images are instead displayed on an external display connected to the cradle. Similarly, SONY Interactive Entertainment LLC provides a cradle with similar function (such as Charging Station or Charging Stand for PS4 (Registered Trademark) as shown by https://www.playstation.com/en-us/explore/accessories/charging-and-other-accessories/). However, the above cradles only provide the function of detecting the connection status and transferring the signal to other displays, while being unable to allow the user to operate, control and access the content of the game console.

Furthermore, Apple Inc. has disclosed a smart dock for chaining accessories (Taiwan patent No. I404279). However, the smart dock only provides signal transmissions between an electronic device and a plurality of accessories. Specifically, the smart dock is configured to receive a set of preferences from an accessory and forward the set of preferences to the electronic device when the smart dock is connected with the plurality of accessories at the same time.

Taiwan patent No. I570529 has disclosed a smart appliance control system which may receive and transmit control signals for a user to operate and control a plurality of appliances through a smart mobile device. However, the smart appliance control system only receives and transmits control unit without having a full control over the smart mobile device and the appliances (i.e., the smart mobile device is served as a remote and the complete content is not accessible through the smart appliance control system). Further, the smart appliance control system is not designed for the connection and control by the mobiles devices of different users.

In addition, China patent application laid open No. 102143336A provides a television serving as a controller in intelligent control network and control method thereof. The television can output a control signal to a device to be controlled, in order to communicate with the device. Similarly, the television only functions as remote controlling external devices without being able to expand and access the complete functions of the device. In other words, the existing arts only serve as bridging stations for bridging the functions of multiple hardware without providing any complete integration, expansion and intelligent learning functions.

Accordingly, there is still a need to provide a mobile dock which provides not only the functions of supplying power to the mobile device, data transmission, data storage and/or connection with other devices, but also integrating the functions of the mobile device (and/or other external devices) connected to the mobile dock more timely and effectively according to the personalized information, such as the identity of the user of the mobile device connected to the mobile dock. Therefore, the user can utilize the functions of the mobile device and other external devices through the mobile dock in a more convenient and efficient way.

SUMMARY

In response to the above-referenced technical inadequacies, the present disclosure provides a mobile dock which triggers a configuration file stored in a memory unit thereof and an application in a mobile device coupled to the mobile dock according to a first identifier of the mobile device and a second identifier stored in the memory unit of the mobile dock, thereby allowing a user to control the mobile device.

In one aspect, the present disclosure provides a mobile dock configured to electrically coupled to a mobile device having a first identifier and an application, the mobile dock comprises a control unit, a memory unit electrically coupled to the control unit, and an I/O module. The memory unit stores at least a second identifier and at least a configuration file. The I/O module comprises an I/O unit, a mobile port and an I/O port. The I/O unit is electrically coupled to the control unit, the mobile port and the I/O port, and the mobile port is configured to electrically coupled to the mobile device. When the mobile device is electrically coupled to the mobile dock, the control unit receives the first identifier from the mobile device and triggers the configuration file corresponding to the first identifier, and transmits the second identifier corresponding to the first identifier to the mobile device, and the mobile device receives the second identifier and triggers the application.

In a preferable embodiment, the mobile dock further comprises a power unit electrically coupled to the control unit and the mobile port, and the power unit is configured to supply power to the mobile dock or the mobile device.

In a preferable embodiment, the mobile device further comprises a bridging APP configured to transmit the first identifier to the control unit, and the bridging APP triggers the application after receiving the second identifier.

In a preferable embodiment, the memory unit stores a plurality of second identifiers and a plurality of configuration files, each of the second identifiers corresponds to a different mobile device and each of the configuration files corresponds to a different mobile device.

In a preferable embodiment, the I/O module further comprises a display port electrically coupled to the I/O unit, and the display port is configured to electrically coupled to a display device.

In a preferable embodiment, the display port is a Video Graphics Array (VGA) port, a Digital Visual Interface (DVI) port, a High Definition Multimedia Interface (HDMI) port or a DisplayPort (DP) port.

In a preferable embodiment, the I/O module further comprises a communication port electrically coupled to the I/O unit, and the communication port is configured to electrically coupled to an external module.

In a preferable embodiment, when the mobile device and the external module are electrically coupled to the mobile dock, the control unit receives the first identifier from the mobile device and triggers the configuration file corresponding to the first identifier, and transmits the second identifier corresponding to the first identifier to the mobile device, the mobile device receives the second identifier and triggers the application, and the external module is triggered to perform an external function.

In a preferable embodiment, the external module comprises at least one of a keyboard, a mouse, a touchpad, a game console, an earphone, a headphone, a joystick, a media player and a camera.

In a preferable embodiment, the memory unit further stores an intelligence configuration which is configured to create the configuration file by intelligence learning.

One of the major technical features of the present disclosure is that the mobile dock provided herein may allow a user of a mobile device to conveniently operate the mobile device and even other external modules through the mobile dock, after the mobile device and the external modules are electrically coupled to the mobile dock, by way of the following technical means: "when the mobile device is electrically coupled to the mobile dock, the control unit receives the first identifier from the mobile device and triggers the configuration file corresponding to the first identifier, and transmits the second identifier corresponding to the first identifier to the mobile device, and the mobile device receives the second identifier and triggers the application", thereby achieving the effect of effectively controlling the mobile device and integrating a plurality of mobile devices and external modules.

BRIEF DESCRIPTION OF THE DRAWINGS

The present disclosure will become more fully understood from the following detailed description and accompanying drawings.

DETAILED DESCRIPTION

Figure 1:
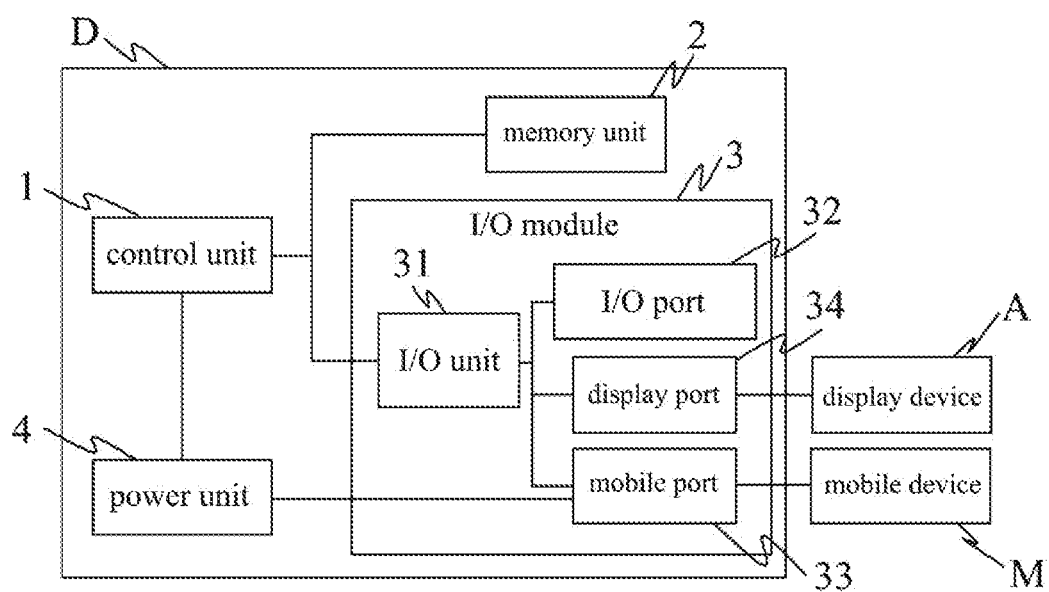
FIG. 1 is a block diagram of a mobile dock according to an embodiment of the present disclosure.

The present disclosure is more particularly described in the following examples that are intended as illustrative only because numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles are used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components or the like, which are for distinguishing one component from another one only; and are not intended to, nor should be construed to impose any substantive limitations on the components or the like.

Reference is made to FIG. 1. FIG. 1 is a block diagram of a mobile dock according to an embodiment of the present disclosure. As shown in FIG. 1, the mobile dock D according to the embodiment of the present disclosure is configured to electrically coupled to a mobile device M. As long as the coupling or connection between the mobile dock D and the mobile device M allows the electrical signals to transmit therebetween, any form of such coupling or connection may be adopted and is not to be limited by the embodiments of the present disclosure. For example, the mobile dock D can be electrically coupled to the mobile device M through wired connection or in a wireless manner. The coupling or connection between the mobile dock D and the mobile device M is attained by the components in the mobile dock D, which will be described in detail later.

In an embodiment of the present disclosure, the mobile device M may be an electronic device that may be carried by a user, such as a mobile phone, a smart phone, a tablet, a personal digital assistance (PDA) and the like. Besides, the mobile device M may be equipped with software, such as all kinds of applications (app), and hardware, such as camera, touchscreen and power port, etc. In addition, it should be noted that the mobile device M may comprise a first identifier and at least an app. Specifically, the first identifier of the mobile device M can be an International Mobile Equipment Identity (IMEI) or any other identifiers that may allow other users or devices to identify the mobile device M, such as a Mobile Equipment Identifier (MEID), an Electronic Serial Number (ESN) or an International Mobile Subscriber Identity (IMSI), etc. In an embodiment of the present disclosure, the first identifier may provide information such as a Vendor Identification (VID), a Product Identification (PID), a Product String or types of the product, etc. However, the present disclosure is not limited thereto. The application(s) (software) of the mobile device M may be any kind of application(s) (Native App, Hybrid App, Web App and the like).

Reference is still made to FIG. 1. The mobile dock D comprises a control unit 1, a memory unit 2 and an I/O module 3. As shown in FIG. 1, the memory unit 2 is electrically coupled to the control unit 1. The I/O module 3 comprises an I/O unit 31, an I/O port 32 and a mobile port 33, and the I/O unit 31 is electrically coupled to the control unit 1, the I/O port 32 and the mobile port 33.

First of all, in an embodiment of the present disclosure, the control unit 1 may be an operator such as a Microcontroller Unit (MCU), which may be integrated with the peripheral memory and operating components such as Central Processing Unit (CPU), Random Access Memory (RAM), Read-Only Memory (ROM) and other I/O interfaces. However, the form of the control unit 1 is not to be limited thereto. The control unit 1 may also be a CPU, and in order to allow the mobile dock D to perform its function, other components, such as I/O controller and the like, can be incorporated into the mobile dock D along with the CPU.

Next, in an embodiment of the present disclosure, the memory unit 2 stores at least one second identifier and at least one configuration file. The memory unit 2 may store the second identifier and the configuration file in a nonvolatile memory (in-device storage), or not only store the second identifier and the configuration file within the mobile dock D, but also in an external storage space (in-network storage), in order to, for example, at least maintain an effective operation while losing Internet access.

It is to be noted that the memory unit 2 may store one or more second identifiers. The second identifier may be a PID allowing the mobile device M to identify the coupling or connection status of the mobile dock D after being received by the mobile device M, thereby allowing corresponding response to be proceeded, such as triggering an application. When the memory unit 2 stores a plurality of second identifiers, each second identifier may be different from each other and corresponds to a first identifier associated with one of the different mobile devices M, respectively. In other words, the memory unit 2 may store a plurality of second identifiers and a plurality of configuration files, in which each second identifier corresponds to a different mobile device M and each configuration file also correspond to the different mobile device M. In fact, the mobile dock D according to an embodiment of the present disclosure may be connected (coupled) to different mobile devices M, provided that each of the mobile devices M has a unique first identifier, and the memory unit 2 stores a plurality of second identifiers corresponding to the unique first identifiers respectively.

As aforementioned, the second identifier stored in the memory unit 2 may trigger a device (such as the mobile device M) or equipment other than the mobile dock D to perform specific operations after being transmitted to the device or equipment. For example, after the mobile dock D transmits the second identifier to a specific device, the device may execute a specific application therein according to the received second identifier. The type and form of the second identifier is not to be limited by the present disclosure.

The configuration file mentioned above refers to a computer file containing computer-readable operational specifications, and may include information of a hardware, a software or other files, specific user information (such as login ID), or the combination thereof. The configuration file stored by the memory unit 2 of the mobile dock D corresponds to a specific second identifier. As mentioned above, because each second identifier corresponds to a first identifier of one of the different mobile devices M, the configuration file stored in the memory unit 2 is indirectly corresponding to a first identifier as well. The details regarding the relationship of the first identifier, the second identifier and the configuration file will be described later.

Reference is made to FIG. 1. The I/O module 3 of the embodiment of the present disclosure includes an I/O unit 31, an I/O port 32 and a mobile port 33. As mentioned above, the I/O unit 31 is electrically coupled to the control unit 1, the I/O port 32 and the mobile port 33. In fact, the I/O unit 31 may be a signal converter for converting protocols into signals that may be received by the connection ports (such as the I/O port 32 and the mobile port 33), and then transmits the signal to the connection ports.

As shown in FIG. 1, in an embodiment of the present disclosure, the I/O module 3 may further include a display port 34 electrically coupled to the I/O unit 31 and the display port 34 is configured to electrically coupled to a display device A. The display port 34 may be a Video Graphics Array (VGA) port, a Digital Visual Interface (DVI) port, a High Definition Multimedia. Interface (HDMI) port of a DisplayPort (DP) port. The form of the display port 34 is not to be limited by the embodiments of the present disclosure. In addition, the I/O module 3 of the mobile dock D may further include other connection ports.

As shown in FIG. 1, in an embodiment of the present disclosure, the mobile dock D may further include a power unit 4, The power unit 4 may be a battery or cell in the mobile dock D or an external power supply. The power unit 4 is electrically coupled to the control unit 1 and the mobile port 33, and is configured to supply power to the mobile dock D itself or the mobile device M coupled or connected to the mobile dock D. Therefore, in some embodiments, the mobile dock D holds the function of charging external devices (such as the mobile device M).

In should be noted that in the embodiments of the present disclosure, when the mobile device M is electrically coupled to the mobile dock D, for example, the mobile device M is electrically coupled to the mobile dock D through the mobile port 33, the control unit 1 receives a first identifier from the mobile device M and triggers a configuration file corresponding to the first identifier. Next, the control unit 1 of the mobile dock D further transmits a second identifier corresponding to the received first identifier to the mobile device M. The mobile device M then receives the second identifier and triggers the application in the mobile device M.

In a preferred embodiment of the present disclosure, the mobile device M further comprises a bridging App (bridging application) configured to transmit the first identifier to the control unit 1 and trigger the application after receiving the second identifier. In other words, a bridging App having the access to the mobile device M may be installed in the mobile device M in advance for allowing the bridging App to transmit the first identifier for identifying the mobile device M to the control unit 1. Further, when the control unit 1 triggers the configuration file corresponding to the first identifier and transmits the second identifier corresponding to the first identifier and the configuration file to the mobile device M, the bridging App may trigger one or more applications corresponding to the second identifier. In other embodiments, the bridging App may be installed in the mobile dock D.

Figure 3:
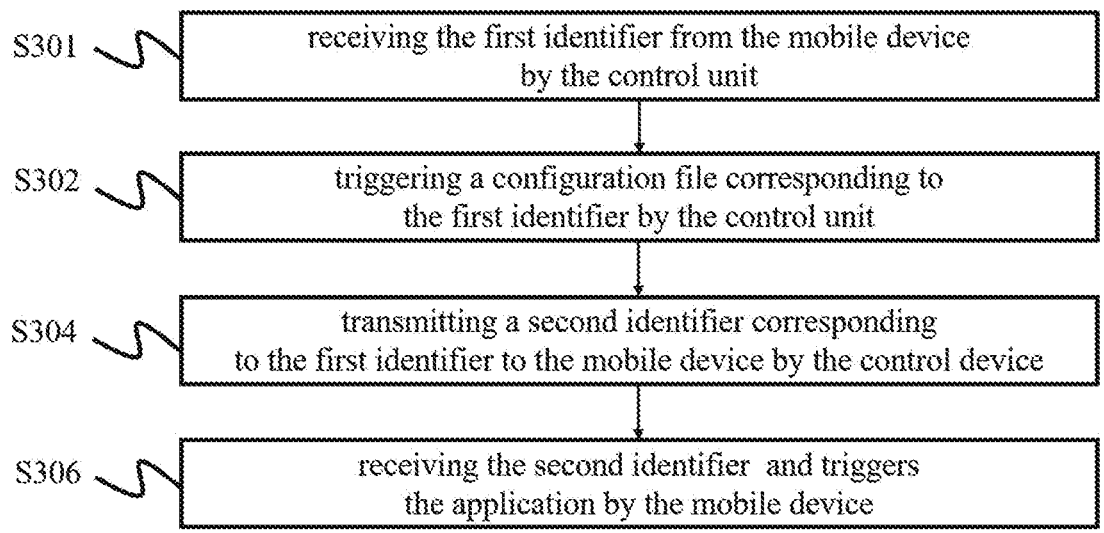
FIG. 3 is a flow chart of a method for operating the mobile dock according to yet another embodiment of the present disclosure.

Reference is made to FIG. 3. FIG. 3 is a flow chart of a method for operating the mobile dock according to yet another embodiment of the present disclosure. As shown in FIG. 3, in step S301 the control unit 1 receives the first identifier that is exclusive for the mobile device M from the mobile device M. In other words, the mobile dock D receives information for identifying the mobile device M from the mobile device M through the control unit 1. For example, according to the first identifier received from the mobile device M, the mobile dock D may identify the user of the mobile device M and obtain additional information that is exclusive for the mobile device M.

Next, in step S302, a configuration file corresponding to the first identifier is triggered according to the first identifier received by the control unit 1. As mentioned above, the memory unit 2 of the mobile dock D stores at least a second identifier and at least a configuration file, and in step S302, the control unit 1 triggers the configuration files corresponding to the first identifier among the one or more configuration files according to the first identifier.

Next, in step S304, control unit 1 transmits the second identifier corresponding to the first identifier to the mobile device M. In this step, the control unit 1 transmit the second identifier related to the configuration file corresponding to the first identifier according to the received first identifier. Therefore, in steps S302 and S304, the identifiers and the configuration file(s) have specific connecting relations therebetween, i.e., the second identifier and the configuration file are both corresponding to the first identifier received from the mobile device M.

Lastly, in step S306, the mobile device M receives the second identifier transmitted by the mobile dock D, and the application in the mobile device M is triggered by the receiving of the second identifier. Therefore, based on the mobile dock D of the present disclosure, when the mobile device M is electrically coupled to the mobile dock D, the corresponding application of the mobile device M may be automatically activated according to the information of the mobile device M (provided by the first identifier).

In some embodiments of the present disclosure, according to the configuration file and the second identifier in the mobile dock D, one or more software or hardware of the mobile device M may be executed or operated. For example, the mobile dock D may allow the user to execute two or more applications in the mobile device M at the same time, and the two or more applications may be executed in a specific order. In addition, the mobile dock D may allow the user to perform specific operations on the software and/or the hardware after activating or executing the software and/or the hardware in the mobile device M. Some specific embodiments will be provided later for exemplifying the operating of the mobile dock D.

Reference is again made to FIG. 1. As mentioned above, in an embodiment of the present disclosure, the I/O module 3 of the mobile dock D may further include a display port 34, and the display port 34 may be configured to connect with the display device A. In such embodiment, the mobile dock D is electrically coupled to both of the mobile device M and the display device A, and therefore, when the control unit 1 triggers the application of the mobile device M according to the first identifier, the second identifier and the configuration file, the mobile dock D may further transmit the interface shown on the mobile device M to the display device A. For example, when the control unit 1 of the mobile dock D triggers an online media streaming application in the mobile device M according to the second identifier, the mobile dock D may further transmit the related display interface, such as an Audio-Visual interface, to the display device A for allowing the user to watch the Audio-Visual interface through the display device A.

Alternatively, in another embodiment, after the mobile dock D receives the first identifier from the mobile device M and triggers the corresponding configuration file, a user interface corresponding to the above operation may be displayed on the display of the mobile device M, thereby allowing the user to select or set up an operating method or operating rule through the input of the display or other peripheral devices (such as an input module of the mobile device M or an input module connected to the mobile device M externally). The control unit 1 may then transmit the corresponding second identifier to the mobile device M according to the operation of the user for triggering the application of the mobile device M.

In the above embodiment, the display device A may be an electronic device with a display, such as a household television, security system having a monitor or intelligent home appliances etc. For example, the display function of the display device A may be attained by a Liquid Crystal Display (LCD), an Organic Light Emitting Diode (OLED) display, an Active-Matrix OLED (AM-OLED), a Plasma Display Panel (PDP) or any other types of display. In the present disclosure, the type of the display device A is not to be limited.

In addition, the input module for the operation and control by the user may be an equipment or module allowing the user to input operation commands, such as a keyboard, a mouse, a touchpad and a microphone, etc. It should be noted that in some embodiments, the display of the display device A may be combined with, for example, a touchpad of an input module to form a touch screen. Therefore, in the above embodiment, the user may input information such as an operation command and the like through the display of the display device A, and the information may be received by the mobile dock D to which the display device A is electrically coupled.

Figure 2:
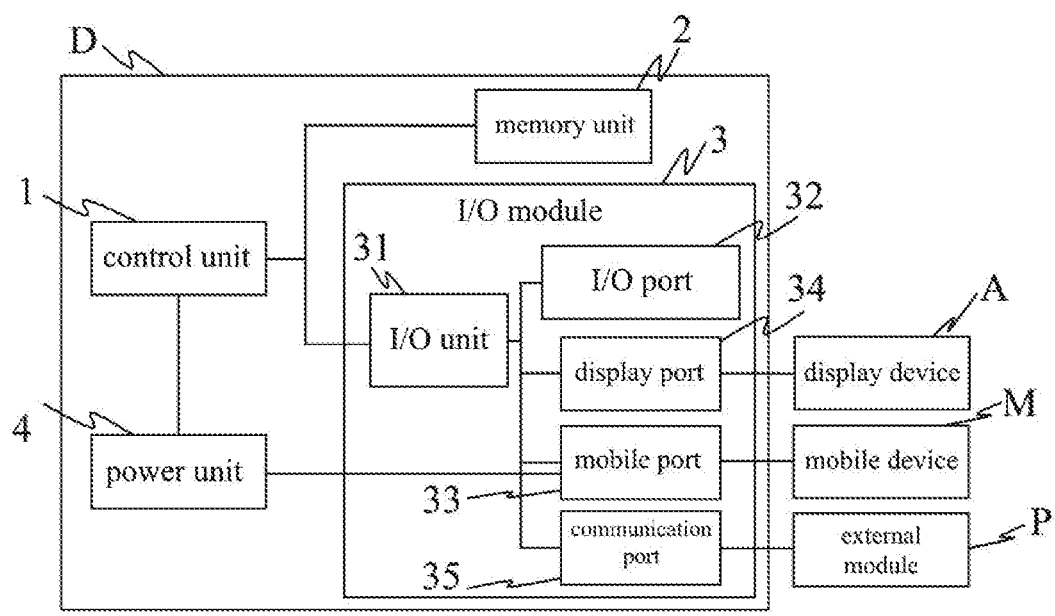
FIG. 2 is a block diagram of a mobile dock according to another embodiment of the present disclosure.

Reference is made to FIG. 2. FIG. 2 is a block diagram of a mobile dock according to another embodiment of the present disclosure. Specifically, the major difference between FIG. 2 and FIG. 1 resides in that the I/O module 3 of the mobile dock D shown in FIG. 2 further includes a communication port 35. In an embodiment of the present disclosure, the communication port 35 may be a wired or wireless connection port, and may include at least one of a Wireless Fidelity (Wi-n) chip, a Bluetooth chip, a Near Field Communication (NFC) chip and a wireless communication chip. Specifically, the Wi-Fi chip and the Bluetooth chip may be used to communicate by way of Wi-Fi and Bluetooth techniques respectively, and the communication port 35 including a Wi-Fi chip or a Bluetooth chip may first transmit or receive a connecting information, such as a Service Set Identifier (SSID) or a session key, and after establishing a communicating connection by means of the above connecting information, the transmitting or receiving of the target information may be performed. In addition, an NFC chip is a chip using NFC technique to communicate, and a wireless communication chip is a chip using various communication protocol, such as Institute of Electrical and Electronics Engineers (IEEE), ZigBee (Registered Trademark), Third Generation (3G), Third Generation Partnership Project (3GPP), and Long Term Evolution (LTE), etc. to communicate.

As shown in FIG. 2, the external module P may be electrically coupled to the mobile dock D through the connection ports, such as the I/O port 32 or the communication port 35. For example, when the external module P is connected to the mobile dock D by wire, the connection may be established through the I/O port 32, and when the external module P is connected to the mobile dock D wirelessly, the connection may be established through the communication port 35. The external module P may be, for example, at least one of a keyboard, a mouse, a touchpad, a game console, an earphone, a headphone, a joystick, a media player and a camera. The type of the external module P in the present disclosure is not limited thereto. Therefore, the user may integrate the mobile device M and one or more external modules P connected to the mobile dock D through the communication port 35 and operate these devices or modules through the mobile dock D. For example, when the external module P is connected to the mobile dock D, the configuration files of the mobile dock D may be used to set up the external module P and other external devices.

Figure 4:
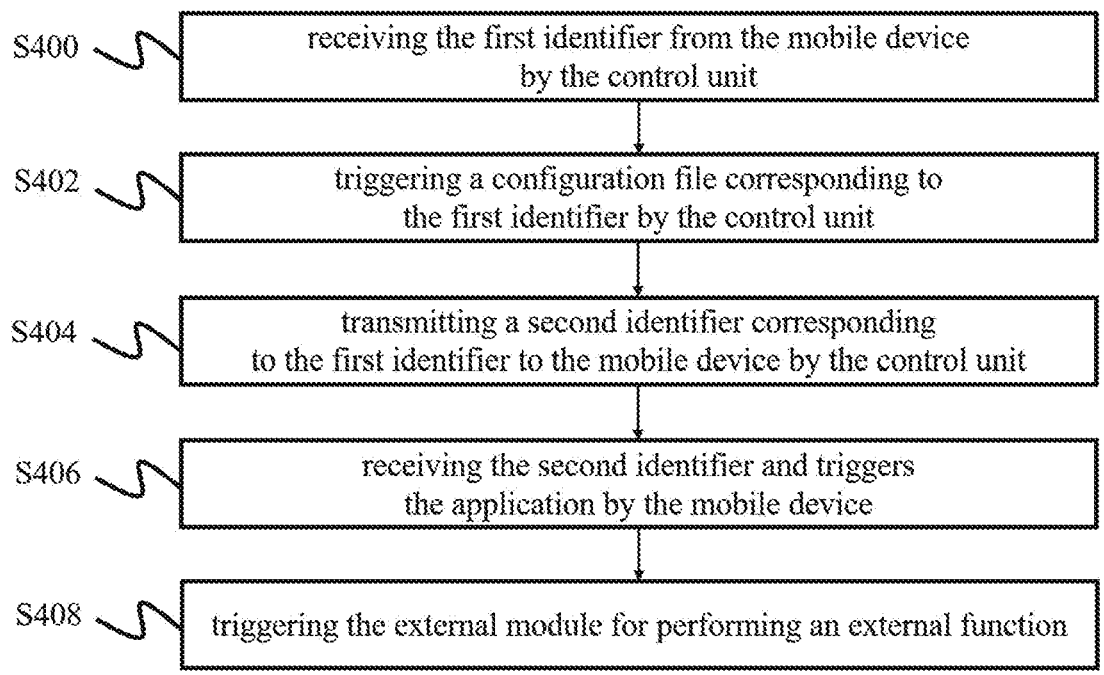
FIG. 4 is a flow chart of another method for operating the mobile dock according to yet another embodiment of the present disclosure.

Reference is made to FIG. 4. FIG. 4 is a flow chart of another method for operating the mobile dock according to yet another embodiment of the present disclosure. The operation method shown in FIG. 4 includes: step S400, receiving a first identifier from the mobile device M by the control unit 1; step S402, triggering the configuration file corresponding to the first identifier by the control unit 1; step S404, transmitting the second identifier corresponding to the first identifier to the mobile device M by the control unit 1; step S406, receiving the second identifier and triggering the application by the mobile device M; and step S408, triggering the external module P for performing an external function.

Figure 5:
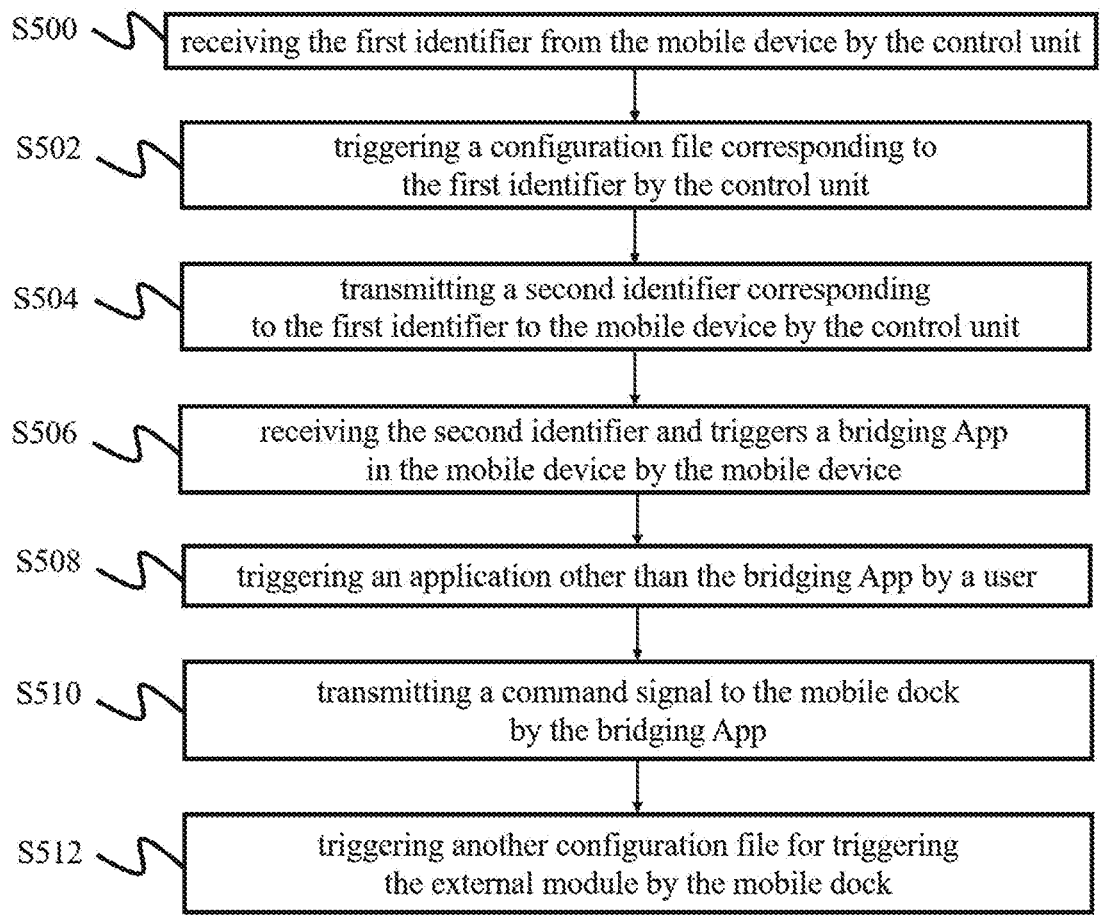
FIG. 5 is a flow chart of yet another method for operating the mobile dock according to yet another embodiment of the present disclosure.

As another embodiment of the present disclosure, reference is made to FIG. 5. FIG. 5 is a flow chart of yet another method for operating the mobile dock according to yet another embodiment of the present disclosure. The major difference between FIG. 5 and FIG. 4 resides in that in the method shown in FIG. 5, after transmitting the second identifier corresponding to the first identifier to the mobile device M by the control unit 1, further includes: in step S506, receiving the second identifier and triggering the bridging App in the mobile device M by the mobile device NI; in step S508, triggering an application other than the bridging App in the mobile device M by the user; in step S510, transmitting a command signal to the mobile dock D by the bridging App; and in step S512, triggering another configuration file for triggering the external module P by the mobile dock D.

Specifically, when the mobile device M and the external module P are both electrically coupled to the mobile dock D, the control unit 1 receives the first identifier from the mobile device M and triggers the configuration file corresponding to the first identifier, and transmits the second identifier corresponding to the first identifier to the mobile device M. The mobile device M receives the second identifier and triggers the application, and the external module P is triggered to perform the external function.

For example, when the external module P is a fill light, and the application in the mobile device M to be triggered is a camera software, the control unit 1 of the mobile dock D may utilize the configuration file and the second identifier corresponding to the first identifier to trigger the camera software in the mobile device M and the fill light (the external module P) at the same time, thereby achieving the integration of multiple devices or equipments.

Besides, the memory unit 2 of the mobile dock D according to an embodiment of the present disclosure may further stores an intelligent configuration, which is configured to create the configuration file by intelligence learning. In fact, in some embodiments of the present disclosure, the related content of the configuration file corresponding to the unique first identifier may be created by the user. For example, the user may create a configuration file including a plurality of operation contents according to actual needs. Alternatively, in other embodiments of the present disclosure, the configuration file is created by the mobile dock D through the intelligent configuration by way of an intelligence learning process.

Next, the operation method of the mobile dock D according to the present disclosure is exemplified through the following examples.

First Example

In the first example, a user utilizes the mobile dock D to integrate the software and hardware of the mobile device M and other external modules P for performing a live webcast. First, the user activates the mobile dock D. In the first example, the mobile dock D may be further connected to a display device A, such as a household television. Next, the user connects the mobile device M, such as a smart phone, to the mobile dock D. The mobile dock D may have a supporting frame having a connection port adaptable to the smart phone (for example, a mobile port 33). The mobile device M electrically coupled to the mobile dock D transmits a unique and exclusive first identifier thereof to the mobile dock D. The control unit 1 triggers a configuration file corresponding to the first identifier and transmits a corresponding second identifier to the mobile device M according to the received first identifier.

It should be noted that when the smart phone (the mobile device M) is connected to the mobile dock D, the connection status of the mobile device M may be detected by the mobile dock D. Meanwhile, the display screens of the mobile device M and the display device A may be, for example, mirror display to each other, thereby allowing the user to view the display content through both or either of the devices according to actual needs. For example, while being a host who is performing the live webcast, the user may check and reply message through the display screen of the mobile device M at the same time. Alternatively, the display of the mobile device M may be, for example, automatically turned-off, and the display content of the mobile device M may be transmitted by the mobile dock D and displayed on the screen of the display device A which is also electrically coupled to the mobile dock D.

After the mobile device M receives the second identifier transmitted by the control unit 1 of the mobile dock D, the webcast application and the camera application in the mobile device M (the smart phone) are triggered and the contents of these applications may be displayed on the display of the display device A. In the first example, the information of the configuration file corresponding to the first identifier is input to the mobile dock D by the user in advance (set up by the user) and stored by the memory unit 2. After receiving the first identifier, the mobile dock D automatically performs corresponding operations with respect to the mobile device M according to the configuration file set up in advance. Therefore, the user does not need to trigger each of the applications in the mobile device M (the smart phone) manually and separately.

In the first example, in addition to the mobile device M and the display device A, an external module P such as a camera, may be further connected to the mobile dock D. Therefore, the user may integrate the functions of the mobile device M, the display device A and the external module P through the mobile dock D automatically in order to, for example, utilize the application of the mobile device M (such as a webcast application), the display and the speaker of the display device A and the camera of the external module P, to perform the live webcast.

Second Example

In the second example, a user utilizes the mobile dock D to integrate the software and hardware of one or more mobile device(s) M and/or other external modules P for having an online conference. As mentioned in the first example, first, the user may activate the mobile dock D and the display device A, such as a household television connected to the mobile dock D. Next, the user connects the mobile device M, such as a smart phone, to the mobile dock D. The mobile device M electrically coupled to the mobile dock D transmits a unique and exclusive first identifier to the mobile dock D. The control unit 1 triggers a configuration file corresponding to the first identifier and transmits a corresponding second identifier to the mobile device M according to the received first identifier.

Meanwhile, the user may further connect other external modules P to the mobile dock D. For example, the user may connect a tablet (such as an iPad (Registered Trademark), etc.,) to the mobile dock D for allowing the mobile dock D to access the information of the tablet.

After the mobile device M receives the second identifier transmitted by the control unit 1 of the mobile dock D, a remote conference application and a camera application in the mobile device NI (the smart phone) are triggered, and a briefing application and/or spreadsheet application and the like in the tablet (the external module P) are also triggered. The display contents of the applications of the mobile device M and the external module P are projected on the display of the display device A. Therefore, the user may integrate the functions of the mobile device M, the display device A and the external module P through the mobile dock D automatically, in order to, for example, utilize the application of the mobile device M (such as a remote conference application), the display and the speaker of the display device A and the applications of the external module P, to conduct the online conference.

In the second embodiment, the configuration file stored in the memory unit 2 of the mobile dock D is an intelligent configuration stored by the memory unit 2 of the mobile dock D, which is created through the operation records and history of the mobile dock D and/or the mobile device M by the user. The created configuration file is stored by the memory unit 2 (which may be stored in the mobile dock D or in a remote server), thereby allowing the user to control each of the external devices connected to the mobile dock D through the mobile dock D.

In sum, the major technical feature of the present disclosure is that the mobile dock D and the operation method thereof according to the embodiments of the present disclosure may allow a user of a mobile device M to conveniently operate the mobile device M and even other external modules P through the mobile dock D, after the mobile device M and the external modules P are electrically coupled to the mobile dock D, by way of the following technical means: "when the mobile device M is electrically coupled to the mobile dock D, the control unit 1 receives the first identifier from the mobile device M and triggers the configuration file corresponding to the first identifier, and transmits the second identifier corresponding to the first identifier to the mobile device NI, and the mobile device M receives the second identifier and triggers the application", thereby achieving the effect of effectively controlling the mobile device M and integrating a plurality of mobile devices M and external modules P.

Specifically, while differing from the expansion devices in the existing art that provide merely the function of transferring the information of the mobile device, namely, projecting the complete content of the mobile device onto an external display and so on, the mobile dock D according to the embodiments of the present disclosure may automatically perform personalized operation upon the mobile device M based on the unique first identifier of the mobile device M and according to the second identifier and the configuration files corresponding to the first identifier. Therefore, the user may connect the platform and interface of the different external devices (the mobile device M, the display device A, the external module P, etc.) in series, in order to conveniently control and operate these external devices in a one-stop manner.

Moreover, the mobile dock D according to the present disclosure may further comprise an intelligent configuration for creating corresponding configuration files for different work procedures according to the setting by the user or an intelligence learning process. Accordingly, the user may perform the functions of a plurality of external devices (the mobile device M, the display device A, the external module P, etc.) through a single and simple operation command, or when the external devices are connected to the mobile dock D, the mobile dock D may automatically execute the operation procedures (the operation rules) according to the first identifier of the mobile device M. Because the mobile dock D according to the present disclosure may store and record the information regarding the configuration, the model, etc.

of various external devices, when these external devices are connected to the mobile dock D, the mobile dock D may integrate these external devices directly without repeating the tedious process of setups which might be complicated. Therefore, the objective of executing and operating different software and hardware of various devices may be achieved by the mobile dock D in a more convenient, intelligent, and highly-efficient manner.

As a result, in practical application, for example, when different family members couple or connect their personal mobile device M to the mobile dock D respectively, the mobile dock D may intelligently recognize and identify the user of the coupled or connected mobile device M, then provides the corresponding configuration file(s) and executes the specific operation manner (such as the type of the application, the operation order, other parameters or settings etc.) stored by the corresponding configuration file(s), and operates the mobile device M according to the second identifier.

The above embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mobile dock configured to electrically coupled to a mobile device having a first identifier and an application, the mobile dock comprises:
   a control unit;
   a memory unit electrically coupled to the control unit, wherein the memory unit stores at least a second identifier and at least a configuration file; and
   an I/O module comprising an I/O unit, a mobile port and an I/O port, wherein the I/O unit is electrically coupled to the control unit, the mobile port and the I/O port, and the mobile port is configured to electrically coupled to the mobile device;
   wherein when the mobile device is electrically coupled to the mobile dock, the control unit receives the first identifier from the mobile device and triggers the configuration file corresponding to the first identifier, and transmits the second identifier corresponding to the first identifier to the mobile device, and the mobile device receives the second identifier and triggers the application.

2. The mobile dock according to claim 1, further comprising a power unit electrically coupled to the control unit and the mobile port, the power unit is configured to supply power to the mobile dock or the mobile device.

3. The mobile dock according to claim 2, wherein the mobile device further comprises a bridging APP configured to transmit the first identifier to the control unit, and the bridging APP triggers the application after receiving the second identifier.

4. The mobile dock according to claim 2, wherein the memory unit stores a plurality of second identifiers and a plurality of configuration files, each said second identifier corresponds to a different mobile device and each said configuration file corresponds to a different mobile device.

5. The mobile dock according to claim 2, wherein the I/O module further comprises a display port electrically coupled to the I/O unit, and the display port is configured to electrically coupled to a display device.

6. The mobile dock according to claim 5, wherein the display port is a Video Graphics Array (VGA) port, a Digital Visual Interface (DVI) port, a High Definition Multimedia Interface (HDMI) port or a DisplayPort (DP) port.

7. The mobile dock according to claim 2, wherein the I/O module further comprises a communication port electrically coupled to the I/O unit, and the communication port is configured to electrically coupled to an external module.

8. The mobile dock according to claim 7, wherein when the mobile device and the external module are electrically coupled to the mobile dock, the control unit receives the first identifier from the mobile device and triggers the configuration file corresponding to the first identifier, and transmits the second identifier corresponding to the first identifier to the mobile device, the mobile device receives the second identifier and triggers the application, and the external module is triggered to perform an external function.

9. The mobile dock according to claim 7, wherein the external module comprises at least one of a keyboard, a mouse, a touchpad, a game console, an earphone, a headphone, a joystick, a media player and a camera.

10. The mobile dock according to claim 2, wherein the memory unit further stores an intelligence configuration which is configured to create the configuration file by intelligence learning.

11. The mobile dock according to claim 1, wherein the mobile device further comprises a bridging APP configured to transmit the first identifier to the control unit, and the bridging APP triggers the application after receiving the second identifier.

12. The mobile dock according to claim 1, wherein the memory unit stores a plurality of second identifiers and a plurality of configuration files, each of the second identifiers corresponds to a different mobile device and each of the configuration files corresponds to a different mobile device.

13. The mobile dock according to claim 1, wherein the I/O module further comprises a display port electrically coupled to the I/O unit, and the display port is configured to electrically coupled to a display device.

14. The mobile dock according to claim 13, wherein the display port is a Video Graphics Array (VGA) port, a Digital Visual Interface (DVI) port, a High Definition Multimedia Interface (HDMI) port or a DisplayPort (DP) port.

15. The mobile dock according to claim 1, wherein the I/O module further comprises a communication port electrically coupled to the I/O unit, and the communication port is configured to electrically coupled to an external module.

16. The mobile dock according to claim 15, wherein when the mobile device and the external module are electrically coupled to the mobile dock, the control unit receives the first identifier from the mobile device and triggers the configuration file corresponding to the first identifier, and transmits the second identifier corresponding to the first identifier to the mobile device, the mobile device receives the second identifier and triggers the application, and the external module is triggered to perform an external function.

17. The mobile dock according to claim 15, wherein the external module comprises at least one of a keyboard, a mouse, a touchpad, a game console, an earphone, a headphone, a joystick, a media player and a camera.

18. The mobile dock according to claim 1, wherein the memory unit further stores an intelligence configuration which is configured to create the configuration file by intelligence learning.

* * * * *